(12) United States Patent
Gaudinat et al.

(10) Patent No.: US 11,929,222 B2
(45) Date of Patent: Mar. 12, 2024

(54) PYROTECHNIC DEVICE WITH RIVETED HOUSING

(71) Applicant: Autoliv Development AB, Vargarda (SE)

(72) Inventors: Francois Gaudinat, Amblainville (FR); Sebastien Menestre, Landerneau (FR); Ludovic Lageat, Brest (FR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 398 days.

(21) Appl. No.: 17/293,711

(22) PCT Filed: Nov. 14, 2019

(86) PCT No.: PCT/EP2019/081300
§ 371 (c)(1),
(2) Date: May 13, 2021

(87) PCT Pub. No.: WO2020/099546
PCT Pub. Date: May 22, 2020

(65) Prior Publication Data
US 2021/0407752 A1 Dec. 30, 2021

(30) Foreign Application Priority Data

Nov. 16, 2018 (FR) ...................................... 1860596

(51) Int. Cl.
*H01H 39/00* (2006.01)
*B60L 3/04* (2006.01)
*H01H 9/04* (2006.01)

(52) U.S. Cl.
CPC ............ *H01H 39/006* (2013.01); *B60L 3/04* (2013.01); *H01H 9/042* (2013.01)

(58) Field of Classification Search
CPC .. B60L 3/00; B60L 3/04; H01H 39/00; H01H 39/006; H01H 9/00; H01H 9/04; H01H 9/042; H01H 2009/04; H01H 2009/048; H01H 2201/01; H01H 2223/00; H01H 2223/002; H01H 2223/006; H01H 2231/026; H01H 85/00; H01H 39/004; H01H 3/00; H01H 3/02; H01H 9/02;
(Continued)

(56) References Cited

U.S. PATENT DOCUMENTS 5,183,357 A * 2/1993 Palm ...................... F16B 19/083
411/29

FOREIGN PATENT DOCUMENTS

| CN | 205943939 U | 2/2017 |
| EP | 0863528 A2 | 9/1998 |

(Continued)

*Primary Examiner* — Anthony R Jimenez
(74) *Attorney, Agent, or Firm* — DICKINSON WRIGHT PLLC

(57) ABSTRACT

A pyrotechnic switch comprises a housing formed by a first housing part and a second housing part, at least one rivet by means of which the first housing part is riveted onto the second housing part in order to form the housing, and at least one pyrotechnic actuator arranged in the housing. Further, at least one of the first housing part or the second housing part comprises a metal insert and a plastic body overmolded onto the metal insert, and the metal insert comprises a passage opening for the rivet such that the rivet is in contact with the passage opening of the metal insert.

15 Claims, 4 Drawing Sheets

(58) Field of Classification Search
CPC ...... H01H 9/0264; H01H 9/043; H01H 9/045; H01H 13/50; H01H 2003/00; H01H 2003/02; H01H 2003/022; H01H 2003/0233; H01H 2003/026; H01H 2003/0273; B61R 21/00; B61R 21/16; B61R 21/264; B61R 21/2644; B61R 2021/01; B61R 2021/01034
USPC ..................................................... 200/61.08
See application file for complete search history.

(56) References Cited

FOREIGN PATENT DOCUMENTS

| | | | |
|---|---|---|---|
| EP | 0929090 | A2 | 7/1999 |
| EP | 0936648 | A2 | 8/1999 |

\* cited by examiner

[Figure 1]
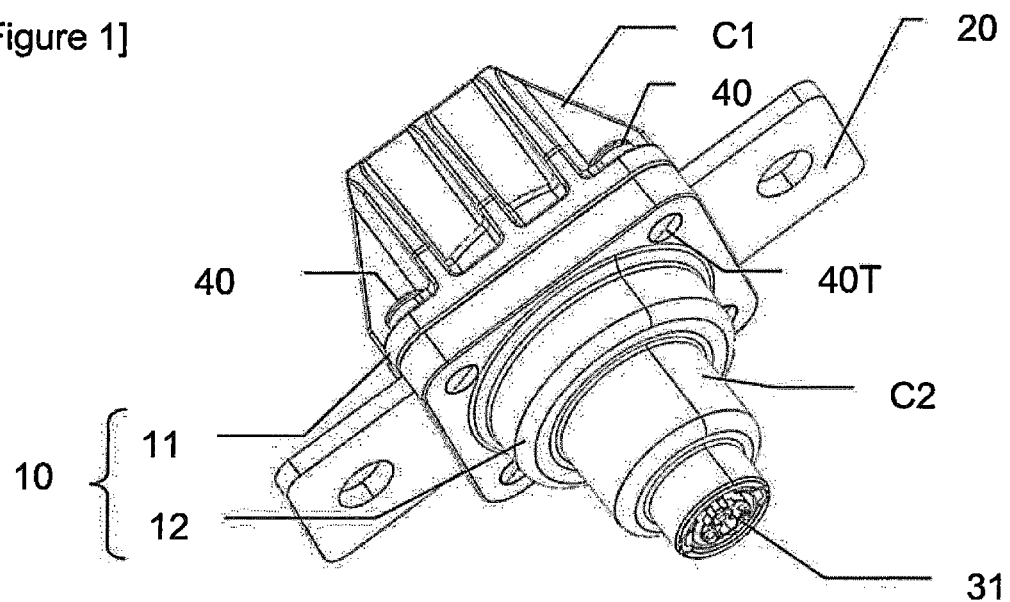
[Figure 2]
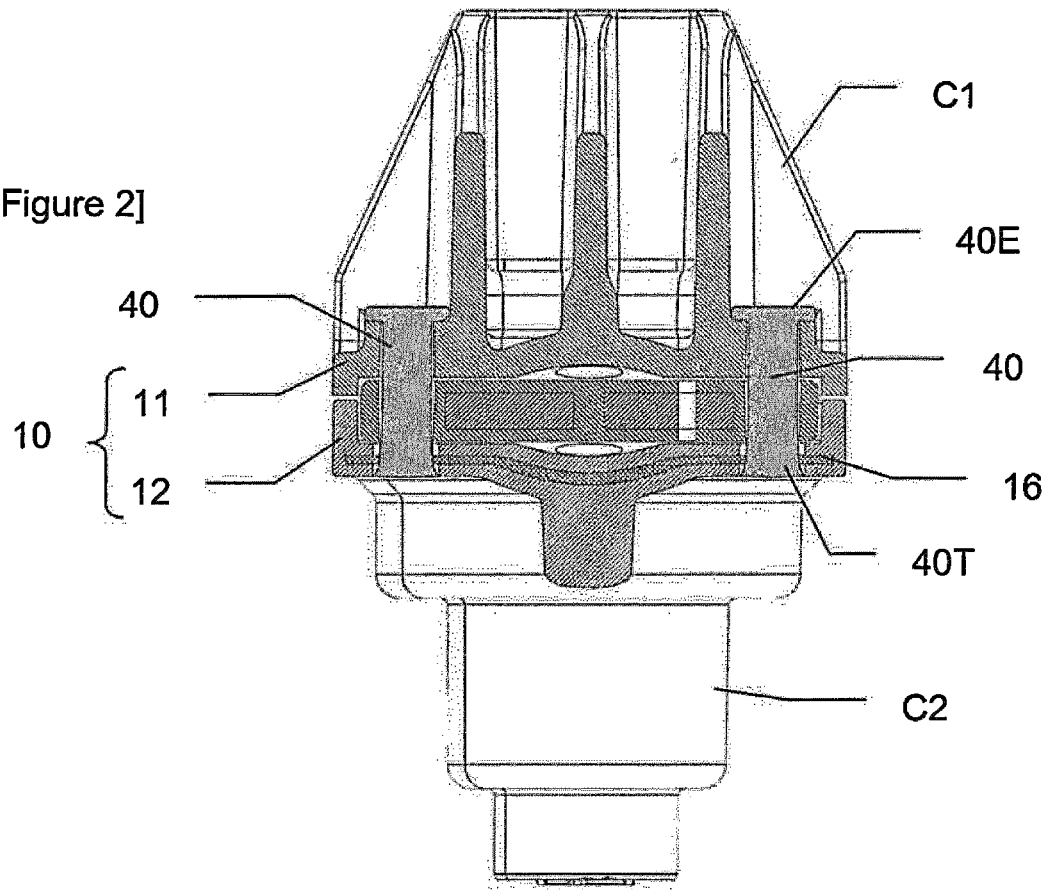

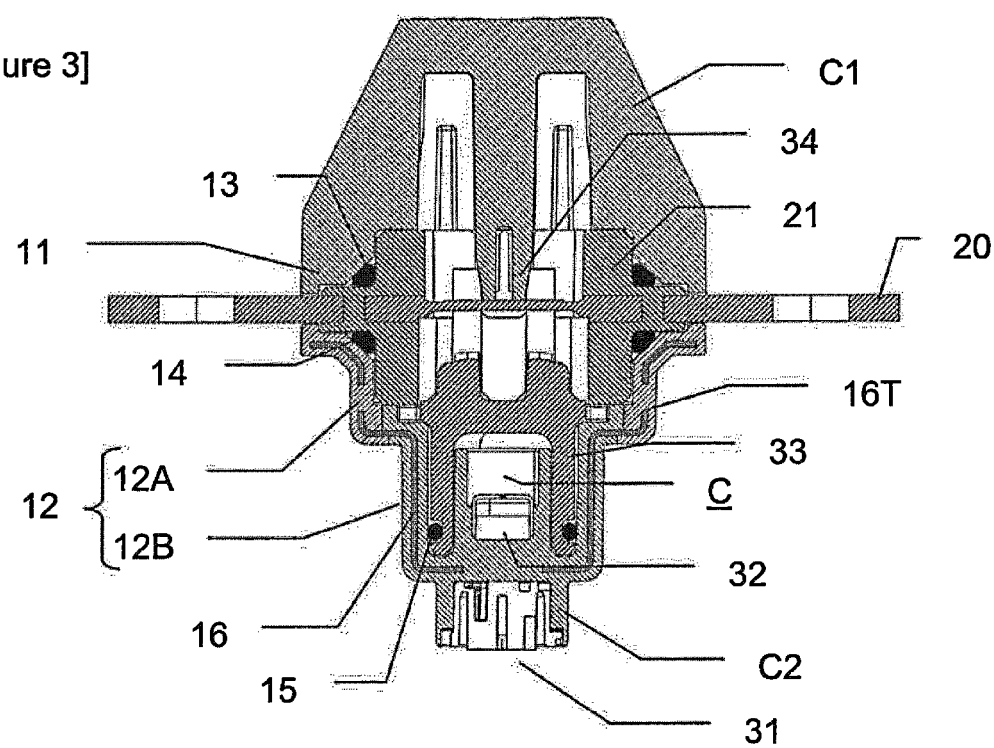
[Figure 3]
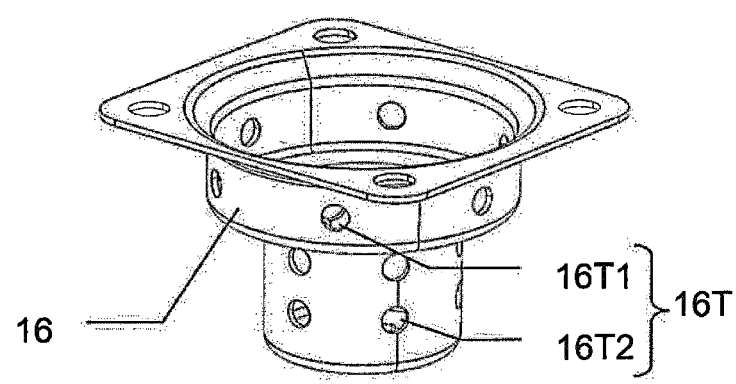
[Figure 4]

[Figure 5]
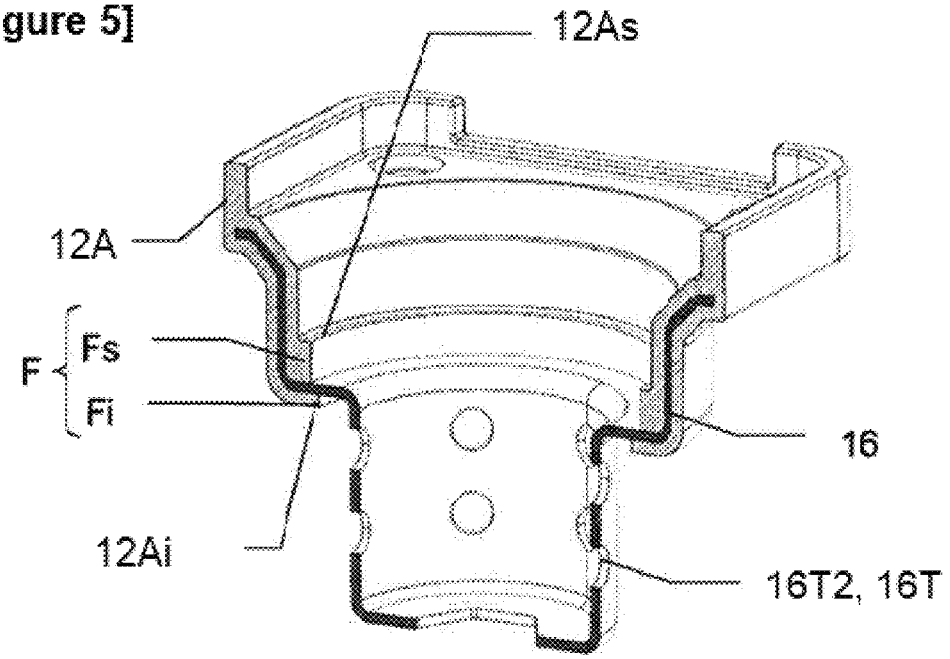
[Figure 6]
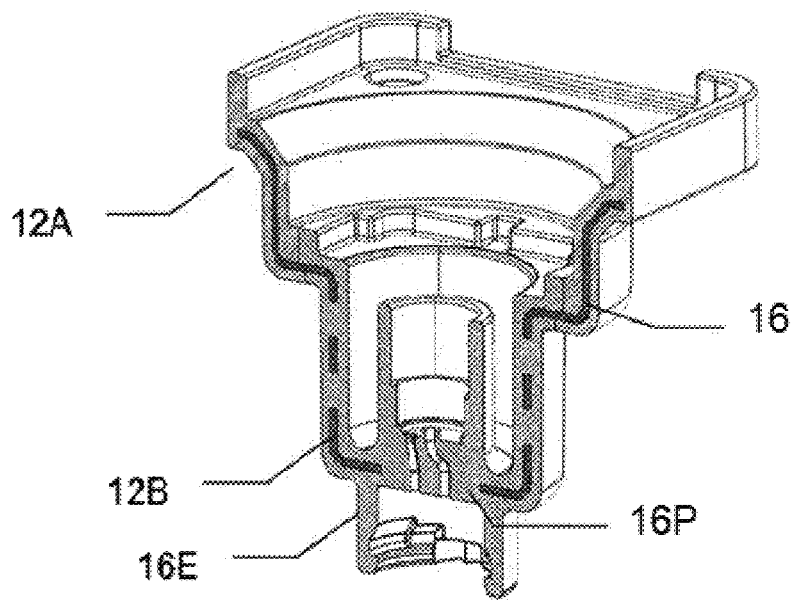

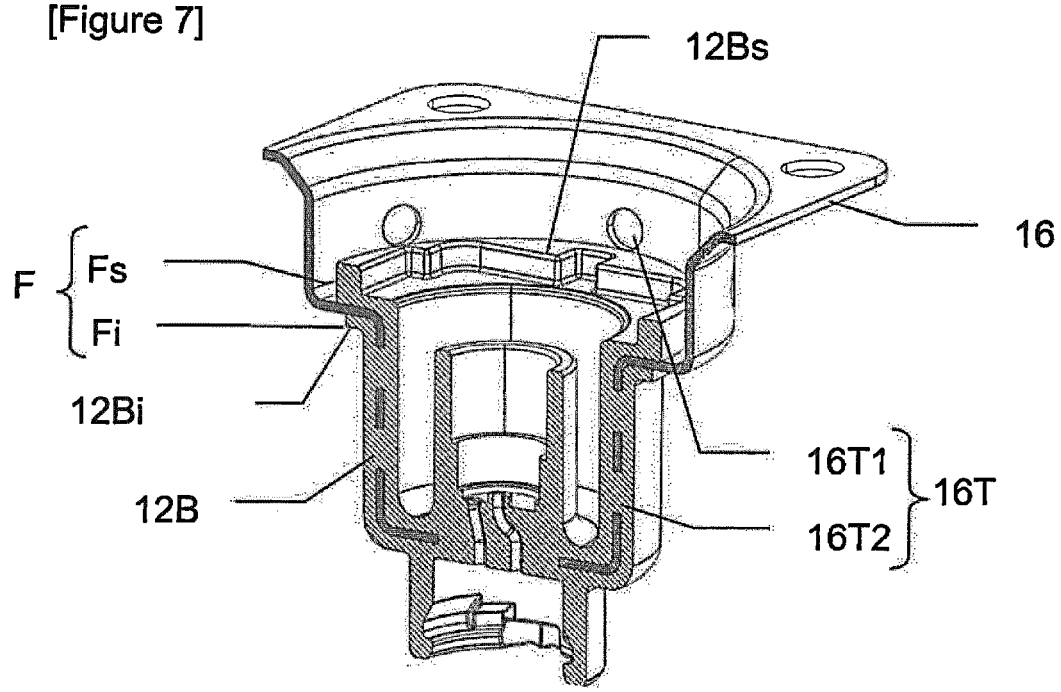
[Figure 7]

PYROTECHNIC DEVICE WITH RIVETED HOUSING

CROSS-REFERENCE TO RELATED APPLICATIONS

This application is a 35 U.S.C. § 371 national phase of PCT International Application No. PCT/EP2019/081300, filed Nov. 14, 2019, which claims the benefit of priority under 35 U.S.C. § 119 to France Patent Application No. 1860596, filed Nov. 16, 2018, the contents of which are incorporated herein by reference in its entirety.

FIELD

This invention generally relates to a pyrotechnic device, for example a pyrotechnic switch, intended to be mounted on an automotive vehicle.

BACKGROUND

Such devices typically comprise a housing in two or several parts that are fastened to one another by clipping, by bolts or by rivets, in order to enclose a pyrotechnic actuator. The document CN205943939 illustrates such a device with a housing. In turn, this system with a housing in several parts namely presents the disadvantage of presenting weaknesses and thus it is difficult to provide a good seal as well as a good resistance to the pressures generated by the pyrotechnic actuator during operation. The method of making same is thus complicated since the weakness of the pieces must be taken into account. The document EP0929090(A2) discloses a pyrotechnic circuit breaker with a support bracket riveted onto a housing part.

SUMMARY

An aim of the present invention is to respond to the disadvantages of the documents of the background art mentioned hereinbefore and in particular, first of all, to propose a pyrotechnic device with a housing in several parts that obtains a good sealing and a good resistance to the operating pressures, while remaining easy to assemble.

A first aspect of the invention therefore relates to a pyrotechnic switch, comprising:
- a housing formed by a first housing part and a second housing part;
- at least one rivet by means of which the first housing part is riveted with (or onto) the second housing part in order to form the housing;
- at least one pyrotechnic actuator arranged in the housing; characterized:
- in that at least one out of the first housing part or the second housing part comprises a metal insert and a plastic body overmolded onto the metal insert, in that the metal insert comprises a passage opening for the rivet, and in that the rivet is in contact with the passage opening of the metal insert. According to the implementation hereinbefore, the rivet is in contact with the metal insert, such that it rests on a piece made of metal that is resistant. The plastic body thus does not receive riveting force or position-retention forces. The weakness of the plastic pieces is no longer a problem.

Advantageously, the rivet is in contact, on the one hand, with the first housing part and, on the other hand, with the second housing part. In other words, a first end of the rivet is in contact with the first housing part and a second end of the rivet is in contact with the second housing part.

Advantageously, the rivet is in contact with a side wall of the passage opening. That is, the swelling of the rivet is taken by the passage opening of the metal insert.

Advantageously, an entire periphery of the rivet is in contact with a side wall of the passage opening. The rivet is thus optimally held.

Advantageously, the rivet comprises, opposite from the contact area with the passage opening, a base with a shoulder perpendicular to an axial direction of the rivet, in order to form a support on or for the other of the first housing part or the second housing part. Such a shouldered base obtains a large support surface, which thus limits the contact pressures. The perpendicular shoulder prevents the creation of radial stresses in the opening of the other of the first housing part or the second housing part.

By convention in the present application, the base forms the rivet tail, and is already formed before the assembly of the pyrotechnic switch. Opposite from the base, the head of the rivet is initially cylindrical in order to be inserted into the passage opening. At the time of assembly, the head is deformed by the riveting tool to be flattened and widened.

Advantageously, the rivet is free from all contact with the plastic body of said at least one out of the first housing part or the second housing part comprising the metal insert with the passage opening in contact with the rivet, in particular in an area of the housing located between the metal insert and the base of the rivet. In other words, the rivet only touches the metal insert of the housing part that comprises same. Thus, the radial forces generated by the riveting operation are firstly and mainly taken by the metal insert. A contact between the head of the rivet once it has been deformed and the housing can be provided, or a recess (a counterbore, for example) at that level.

Advantageously, at the level of the passage opening, the metal insert presents a passage having a size less than a passage around the rivet of said at least one out of the first housing part or the second housing part comprising the metal insert. In other words, the insert presents a passage hole having a size less than the passage hole of the plastic body, which ensures the lack of contact of the rivet with the plastic body. This ensures that the rivet first contacts the metal insert when it deforms. In particular, the insert presents a passage hole with a diameter less than the diameter performed in the plastic body.

Advantageously, the metal insert comprises a plurality of overmolding openings, so as to enable an overmolding of the plastic body of the two sides of the metal insert, and a continuity of material of the plastic body through the overmolding openings. The plastic body is thus tightly joined with the metal insert, and the manufacturing method (typically by injection molding) remains simple to implement.

Advantageously, the area of the rivet in contact with the passage opening, is an area deformed by a riveting operation at the time of the assembly of the pyrotechnic switch. Typically, the riveting operation is a crimping operation, radial crimping or radial riveting, or orbital crimping or orbital riveting, or even spin riveting. A snap die (a cylindrical tool inclined with respect to the rivet) is pushed onto the head of the rivet to crush, flatten and radially widen it by plastic deformation. By way of this operation, the rivet part in the opening changes from a generally cylindrical shape to a generally conical shape.

Advantageously, the other of said at least one out of the first housing part or the second housing part comprising the metal insert with the passage opening in contact with the rivet, is only in contact with the rivet via an electrically insulating material, such as a plastic material.

Advantageously, the other of said at least one out of the first housing part or the second housing part comprising the metal insert with the passage opening in contact with the rivet, presents another passage opening for the rivet, and is free from the metal insert at the level of the other passage opening. In other words, the other housing part (that which is in contact with the base of the rivet) is completely made of plastic, since there is no need for the insert.

Advantageously, the other passage opening presents a passage cross section greater than a passage cross section of the metal insert.

Advantageously, the pyrotechnic switch comprises an electrical conductor passing through the housing and arranged between the first housing part and the second housing part.

Advantageously, the electrical conductor is sandwiched and compressed between the first housing part and the second housing part. As a result, the rivet exerts a compressive force on the electrical conductor (sandwiched between the first housing part and the second housing part, they themselves being fastened to each other by the rivet).

Advantageously, the electrical conductor comprises a passage opening passed through by the rivet. Furthermore, a ring made of insulating material (overmolded or attached plastic for example) may be provided between the rivet and the electrical conductor.

A second aspect of the invention relates to an automotive vehicle comprising a pyrotechnic switch according to the first aspect of the invention.

A third aspect of the invention relates to a method of making a pyrotechnic switch according to the first aspect of the invention, comprising the steps of:

coupling, assembling or positioning the first housing part with the second housing part, passing a free end of the rivet through the passage opening, deforming, through a crimping operation, the free end, so as to make the rivet contact the passage opening, on the entire periphery thereof.

Advantageously, the step of deforming the free end is sufficiently long in order to radially deform the free end at the level of the passage opening, and sufficiently short in order to not radially deform the base of the rivet located opposite from the free end and facing the other passage opening.

Advantageously, the step of deforming the free end is preceded by a step consisting of flattening or compressing the housing parts towards one another. A tool referred to as a "blank holder" can be used, mounted on a spring and that descends at the same time as the riveting tool (the snap die) and that touches one of the housing parts before the riveting tool touches the rivet to be crimped or deformed.

In a more general manner, the invention thus relates to a pyrotechnic device comprising:

a housing formed by a first housing part and a second housing part;

at least one rivet by means of which the first housing part is riveted onto the second housing part in order to form the housing;

at least one pyrotechnic actuator arranged in the housing; characterized:

in that at least one out of the first housing part or the second housing part comprises a metal insert and a plastic body overmolded onto the metal insert, in that the metal insert comprises a passage opening for the rivet, and in that the rivet is in contact with the passage opening of the metal insert.

Advantageously, the pyrotechnic device forms a pyrotechnic switch.

Typically, a pyrotechnic switch can be an element for cutting off an electric circuit, or for closing an electric circuit of an automotive vehicle.

BRIEF DESCRIPTION OF THE DRAWINGS

Other characteristics and advantages of this present invention will become more apparent upon reading the detailed description of an embodiment of the invention which is provided by way of example, but in no manner limited thereto, and illustrated by the attached drawings, wherein:

FIG. 1 depicts a perspective view of a pyrotechnic device according to the invention;

FIG. 2 depicts a cross sectional view of the pyrotechnic device of FIG. 1;

FIG. 3 depicts another cross sectional view of the device of FIG. 1;

FIG. 4 depicts a view of a metal insert of the device of FIG. 1

FIG. 5 depicts a cross section of a part of the housing of the pyrotechnic device of FIG. 1, at a first stage of manufacture;

FIG. 6 depicts a cross section of a part of the housing of the pyrotechnic device of FIG. 1, at a second stage of manufacture;

FIG. 7 depicts a manufacturing alternative of the pyrotechnic device of FIG. 1.

DETAILED DESCRIPTION

FIG. 1 depicts a perspective view of a pyrotechnic device according to the invention, comprising a housing 10 formed by a first housing part 11 and second housing part 12. An electrical conductor 20 is sandwiched between the first housing part 11 and the second housing part 12.

The lower part of FIG. 1 shows a connection interface 31 of a pyrotechnic actuator 32 that is installed in the housing 10 and shown in FIG. 3.

This FIG. 3 shows the inner structure of the pyrotechnic device, arranged herein as a switch intended to cut off the electric conductor 20 if necessary (cut off of the power circuit of the vehicle in the event of an accident for example).

For this purpose, the electric conductor 20 holds an overmolded guide piece 21, which forms a bore wherein a punch 33 is placed, and which forms with the second housing part 12 a combustion chamber C facing the pyrotechnic actuator 32 (herein an electric pyrotechnic igniter, but an additional pyrotechnic relay may be considered if necessary). In FIG. 3, the punch 33 is in a resting position.

The first housing part 11 comprises, facing the punch 33 and on the other side of the electric conductor 20, a counter form 34 that may be considered as an anvil or a die.

Whereupon it is necessary to cut off the electric conductor 20, the pyrotechnic actuator 32 is fired, which causes a strong increase in pressure in the combustion chamber, such that the punch 33 is pushed towards the top of FIG. 3 according to a translational movement from the resting position towards a final position wherein the electric conductor 20 has been cut off.

Considering that the pyrotechnic device is intended to be able to operate even after several years of service life, and that in operation, pressures of several tens of bars or more are intended, sealing means are intended between the first housing part 11, the second housing part 12, the guide part 21, with according to the example depicted gaskets 13 and 14. A sealing gasket 15 is also intended between the punch 33 and the second housing part 12.

Ensuring a good fastening between the first housing part 11 and the second housing part 12 is thus understood. However, in order to ensure a good electric insulation, it must also be provided that the housing 10 does not conduct electricity between the electric conductor 20 and the mass of the vehicle for example. To meet this last condition, each housing part 11 and 12 present a plastic body C1 or C2. In order to meet this fastening condition, riveting the housing parts 11 and 12 together is intended, with the help of rivets 40 shown in FIGS. 1 and 2. Before assembly of the housing, and with which to ensure an effective maintenance of the electric conductor 20 and a sealing of the device, the first housing part 11 and the second housing part 12 are not in contact.

FIG. 2 depicts a cross section at the level of the rivets 40 to illustrate the assembly. In particular, arranging a metal insert 16 in the second housing part 12 is intended, so as to limit the stresses on the plastic body of this second housing portion 12.

The rivets 40 are shouldered rivets. That is, before riveting, they present a base 40E and a cylindrical body, so as to be able to be inserted in each housing part 11 and 12 that presents a passage opening for the rivets 40. Then, each rivet 40 is deformed at the level of the head 40T thereof in order to complete the assembly, ensuring the sealing of the device and preventing all subsequent disassembly. According to this implementation, the heads 40T are buried under or flush with the surface of the second housing part 12.

In practice during this riveting operation, the base 40E of each rivet 40 abuts against a base tool, and a snap die (riveting tool) that may move according to a particular movement in order to be at least momentarily inclined with respect to the axis of the rivet 40 comes into contact on the head 40T of the rivet 40 in order to apply a vertical force thereon, so as to crush and widen the head 40T by plastic deformation through the rotation and/or oscillation movement of the snap die.

The riveting operation leads to deforming the head 40T so as to ensure an axial stop of the second housing portion 12, without deforming the entire cylindrical part of the rivet 40, namely at the level of the base 40E.

As seen in FIG. 2, the plastic body C2 of the second housing part 12 presents a passage opening that is larger than that of the metal insert 16, such that the rivet 40, at the level of the head 40E, only touches the second housing part 12 via the metal insert 16. As a result, no radial force is exerted by the rivet 40 on the plastic body C2. The risks of cracking, breaking, damage of the plastic are thus avoided. In other words, the passage diameter for the rivet 40 in the plastic bodies C1 and C2 are greater than the passage diameter in the metal insert 16.

This implementation ensures that the rivet 40 only touches the second housing part 12 via the metal insert 16, and a swelling of the diameter of the shank thereof does not lead to a contact of the rivet 40 with one or the other of the plastic bodies C1 or C2.

Furthermore, as the rivet 40 is not deformed at the level of the base 40E thereof, it is not necessary to provide a metal insert in the first housing part 11 in order to resist the riveting operation, according to a preferred and optional implementation. The first housing part is thus only made up of a plastic body C1 according to this implementation.

FIG. 4 shows an example of a metal insert 16, which has holes 16T (visible in FIGS. 4, 5 and 6), in order to enable a continuity of plastic material of the plastic body C2 of the second housing part 12, so as to facilitate the overmolding operation and obtain a solid plastic body C2.

The metal insert 16 can be made of drawn steel of the type DC04-1.0338 (Re: 210-220 MPa, Rm: 270-350 MPa, A %>38%).

The plastic body C1 of the first housing part 11 can be made of a polymer, such as polyamide (PA, PA6.6, PA6.12), or polyoxymethylene (POM), optionally loaded with reinforcement fibers, such as glass fibers, for example in a proportion of 25% to 35% by weight. The rivets 40 can be made of steel, copper, aluminum with a significant elongation at break (A %>20% for example).

As for the second housing part 12, it is made up of two plastic materials: a first portion 12a made of a first plastic material and a second portion 12B made of a second plastic material.

The connection interface 31 is thus carried out in the second portion 12B of the second housing part 12 which is manufactured with the second plastic material, and for example polyamide (PA, PA6, PA6-12, PA6-6) can be used, and it comprises between 10% and 50% by weight of reinforcement fibers, for example glass fiber. In particular, polyamide PA6 can be selected with 30% by weight of glass fiber. As a result, shapes (grooves, recesses) of small dimensions and nevertheless precise at the level of the connection interface 31 can be provided, the second plastic material selected being easy to inject into molds with complex shapes. Furthermore, the second material selected can also correctly withstand the pressures present in the combustion chamber C due to added reinforcement fibers.

In addition, the first portion 12A of the second housing part 12 that is manufactured with the first plastic material can be intended to be exposed in operation of the switch to a medium wherein an electric arc is formed. According to such a case of figure, a part of the first plastic material is arranged to be removed by ablation, and the first plastic material is selected from among Polyphthalamide (PPA), polyoxymethylene (POM), poly(methyl methacrylate) (PMMA).

FIG. 5 shows the second housing part 12 after a first injection molding operation during which the first portion 12A has been injection molded with the first plastic material.

FIG. 6 represents the second housing part 12 after a second injection molding operation during which the second portion 12B has been injection molded with the second plastic material.

FIG. 5 also shows that the first plastic material is molded up to the level of a shoulder of the metal insert 16, with an offset of a limit F between the two sides of the metal insert 16. Indeed, a lower limit Fi (of the lower side of the metal insert 16 in FIG. 5) presents an inner diameter smaller than an upper limit Fs, of the other side. The construction provides several benefits. Indeed, the shoulder of the metal insert 16 is free from holes, and in combination with the offset of the limit, this enables a good rigidity of the second housing part 12, and weak deformations, to be obtained. This limits the risks of breaking, delamination, and cracking.

It may also be mentioned that the manufacturing mold for the second injection molding operation of the second plastic material can rest on the surfaces 12As and/or 12Ai of the first plastic material, at the level of the limit F, which also simplifies manufacturing.

With regards to the metal insert 16, the latter has holes 16T visible in FIGS. 4, 5 and 7 that comprise holes 16T1 and 16T2 each dedicated to enabling a continuity respectively of the first plastic material and the second plastic material. Lastly, the metal insert 16 comprises in the lower part thereof represented in FIG. 6 a shoulder 16E with a passage hole 16P for the pyrotechnic actuator 32 (visible in FIG. 3 and not FIG. 6 for reasons of clarity). The shoulder 16E is free from holes or recesses other than the passage hole 16P, so as to present a suitable resistance to the forces and stresses present in this area during operation, namely due to pressures in the combustion chamber C.

FIG. 7 depicts a manufacturing alternative, whereby the second plastic material is injected first. Meanwhile, the limit F still comprises an offset (Fs, Fi) between the two sides of the metal insert 16, and support surfaces 12B, 12Bi with a continuous perimeter to obtain a sealed support on the manufacturing mold for the subsequent overmolding operation.

It will be understood that different modifications and/or improvements which are obvious for the person skilled in the art may be made to the different embodiments of the invention described in this present description without departing from the scope of the invention.

The invention claimed is:

1. A pyrotechnic switch, comprising:
   a housing, formed by a first housing part and a second housing part;
   at least one rivet by means of which the first housing part is riveted with the second housing part in order to form the housing;
   at least one pyrotechnic actuator arranged in the housing; wherein:
   at least one out of the first housing part or the second housing part comprises a metal insert and a plastic body overmolded onto the metal insert,
   the metal insert comprises a passage opening for the at least one rivet, and
   the at least one rivet is in contact with the passage opening of the metal insert.

2. The pyrotechnic switch according to claim 1, wherein the rivet is in contact with a side wall of the passage opening.

3. The pyrotechnic switch according to claim 1, wherein an entire periphery of the rivet is in contact with a side wall of the passage opening.

4. The pyrotechnic switch according to claim 1, wherein the rivet comprises, opposite from a contact area with the passage opening, a base with a shoulder perpendicular to an axial direction of the rivet, in order to form a support for the other of the first housing part or the second housing part.

5. The pyrotechnic switch according to claim 1, wherein the rivet is free from all contact with the plastic body of said at least one out of the first housing part or the second housing part comprising the metal insert with the passage opening in contact with the rivet, in an area of the housing located between the metal insert and a base.

6. The pyrotechnic switch according to claim 1, wherein, at the level of the passage opening, the metal insert presents a passage having a size less than a passage of said at least one out of the first housing part or the second housing part comprising the metal insert.

7. The pyrotechnic switch according to claim 1, wherein the metal insert comprises a plurality of overmolding openings, so as to enable an overmolding of the plastic body of the two sides of the metal insert, and a continuity of material of the plastic body through the overmolding openings.

8. The pyrotechnic switch according to claim 1, wherein an area of the rivet in contact with the passage opening, is deformed by a crimping operation at the time of the assembly of the pyrotechnic switch.

9. The pyrotechnic switch according to claim 1, wherein the other, of said at least one out of the first housing part or the second housing part comprising the metal insert with the passage opening in contact with the rivet, is only in contact with the rivet via an electrically insulating material, such as a plastic material.

10. The pyrotechnic switch according to claim 1, comprising an electrical conductor passing through the housing and arranged between the first housing part and the second housing part.

11. The pyrotechnic switch according to claim 1 in combination with an automotive vehicle.

12. The pyrotechnic switch according to claim 1, wherein the other, of said at least one out of the first housing part or the second housing part comprising the metal insert with the passage opening in contact with the rivet, presents another passage opening for the rivet, and is free from the metal insert at a level of an other passage opening.

13. The pyrotechnic switch according to claim 12, wherein the other passage opening presents a passage cross section greater than a passage cross section of the metal insert.

14. A method of making a pyrotechnic switch according to claim 1, comprising the steps of:
    positioning the first housing part with the second housing part,
    passing a free end of the rivet through the passage opening,
    deforming, through a crimping operation, the free end, so as to make the rivet contact the passage opening, on an entire periphery thereof.

15. The method of making the same according to claim 14, wherein the step of deforming the free end is long in order to radially deform the free end at a level of the passage opening, and sufficiently short in order to not radially deform the base of the rivet located opposite from the free end and facing an other passage opening.

* * * * *